US005555242A

United States Patent [19]

Saitou

[11] Patent Number: 5,555,242
[45] Date of Patent: Sep. 10, 1996

[54] SUBSTATION APPARATUS FOR SATELLITE COMMUNICATIONS

[75] Inventor: Syuji Saitou, Kawasaki, Japan

[73] Assignee: Fujitsu Limited, Kanagawa, Japan

[21] Appl. No.: 380,596

[22] Filed: Jan. 30, 1995

[30] Foreign Application Priority Data

Aug. 22, 1994 [JP] Japan ..................... 6-196433

[51] Int. Cl.$^6$ ............... H04J 3/14; H04B 7/185
[52] U.S. Cl. ............... 370/17; 370/95.1; 455/12.1
[58] Field of Search ............... 370/85.2, 85.3, 370/104.1, 95.1, 95.3, 77, 94.1, 95.2, 110.1; 455/13, 17, 12.1, 13.1, 13.2, 13.3, 50.1, 63, 78, 83, 84, 85, 63, 229

[56] References Cited

U.S. PATENT DOCUMENTS

| | | | |
|---|---|---|---|
| 4,090,036 | 5/1978 | Stott et al. | 370/110.1 |
| 4,688,213 | 8/1987 | Raychaudhuri | 370/96.1 |
| 4,688,216 | 8/1987 | Saburi | 370/104.1 |
| 4,742,512 | 5/1988 | Akashi et al. | 370/95.3 |
| 5,216,427 | 6/1993 | Yan et al. | 370/85.2 |
| 5,257,257 | 10/1993 | Chen et al. | 370/85.2 |

FOREIGN PATENT DOCUMENTS

| | | |
|---|---|---|
| 62-37758 | 2/1987 | Japan . |
| 4-148361 | 5/1992 | Japan . |

Primary Examiner—Wellington Chin
Assistant Examiner—Huy D. Vu

[57] ABSTRACT

A substation apparatus for satellite communication in which communication between a master station and a plurality of substations is achieved via a communication satellite, wherein a large amount of burst data can be transmitted with small delay. A receiving unit receives a radio wave transmitted from another substation to the master station, and based on the output of the receiving unit, a transmission detecting unit determines whether another substation is transmitting data. When it is judged by the transmission detecting unit that data transmission from another substation is completed, a transmitting unit transmits data therefrom to the master station. If it is judged by the transmission detecting unit that no one of the other substations is transmitting data, the transmitting unit immediately transmits data therefrom to the master station.

3 Claims, 6 Drawing Sheets

SUBSTATION APPARATUS FOR SATELLITE COMMUNICATIONS

BACKGROUND OF THE INVENTION (1) Field of the Invention

The present invention relates to a substation apparatus for satellite communications in which communication between a master station and a plurality of substations is achieved via a communication satellite, and more particularly, to a substation apparatus which enables a substation to access a master station in satellite communications wherein a vast amount of data is transmitted in burst mode between a master station equipped with a host computer and a plurality of substations each equipped with a terminal processing device.

Recently digital satellite communication techniques have been investigated and actively put to practical use with an increasing demand for non-telephonic services such as data communication and pictorial communication and the development of digital devices such as computer and LSI. One of topical digital satellite communication procedures is a TDMA (Time Division Multiple Access) method. The substation apparatus of the present invention permits a substation to access a master station where a large amount of burst data is transmitted according to the TDMA procedure.

(2) Description of the Related Art

When a VSAT (Very Small Aperture Terminal) station as a substation accesses a HUB station as a master station for data communication, the following access methods are conventionally used:

(a) Time slots are previously assigned to individual VSAT stations, and each VSAT station transmits data to the HUB station within the time slot uniquely assigned thereto.

(b) Each VSAT station immediately transmits data to the HUB station within the time slot as soon as the data is generated.

(c) Each VSAT station makes a reservation for transmission with respect to the HUB station when transmitting data is generated, and transmits the data to the HUB station within a time slot assigned thereto by the HUB station.

The method (a) is suited for the case wherein almost equal amount of transmitting data is usually generated in each of the VSAT stations.

The method (b) is suited for the case wherein data is generated in burst mode in each VSAT station. In order to lessen the probability that data transmitted from the VSAT stations will collide with one another, the transmissible amount of data is set to a value greater than the amount of actually transmitted data. As a result, the frequency band occupied by the system inevitably broadens, compared with the scale of the system.

The method (c) also is suited for the case wherein a large amount of burst data is generated at each VSAT station. In this method, however, a reservation for transmission must be made before data is transmitted.

Thus, the method (a) is not suited for transmitting a large amount of burst data, while although the method (b) is suited for burst transmission of data, the occupied frequency band greatly broadens with increase in the amount of burst data, making the method unpractical. Accordingly, the method (b) cannot be said to be suited for transmitting a large amount of burst data. In the method (c) which permits transmission of a large amount of burst data, since a reservation for transmission must be made prior to data transmission, actual data transmission is delayed usually by about 0.5 second due to the reservation.

SUMMARY OF THE INVENTION

An object of the present invention is to provide a VSAT station apparatus for satellite communications which is designed to transmit a large amount of burst data with small delay.

To achieve the above object, there is provided according to the present invention a substation apparatus for satellite communication in which communication between a master station and a plurality of substations is achieved via a communication satellite. The substation apparatus comprises receiving means for receiving a radio wave transmitted from another substation to the master station, transmission detecting means for determining based on an output of the receiving means whether another substation is transmitting data, and transmitting means for controlling data transmission therefrom to the master station in accordance with an output of the transmission detecting means.

The present invention also provides a substation apparatus for satellite communication which comprises receiving means for receiving a radio wave transmitted from another substation to the master station, identification signal detecting means for detecting an identification signal from an output of the receiving means, end timing detecting means for detecting timing at which data transmission from another substation ends, based on the identification signal detected by the identification signal detecting means, and transmitting means for controlling data transmission therefrom to the master station in accordance with outputs of the end timing detecting means and the identification signal detecting means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments according to the present invention will be outlined first.

Figure 1:
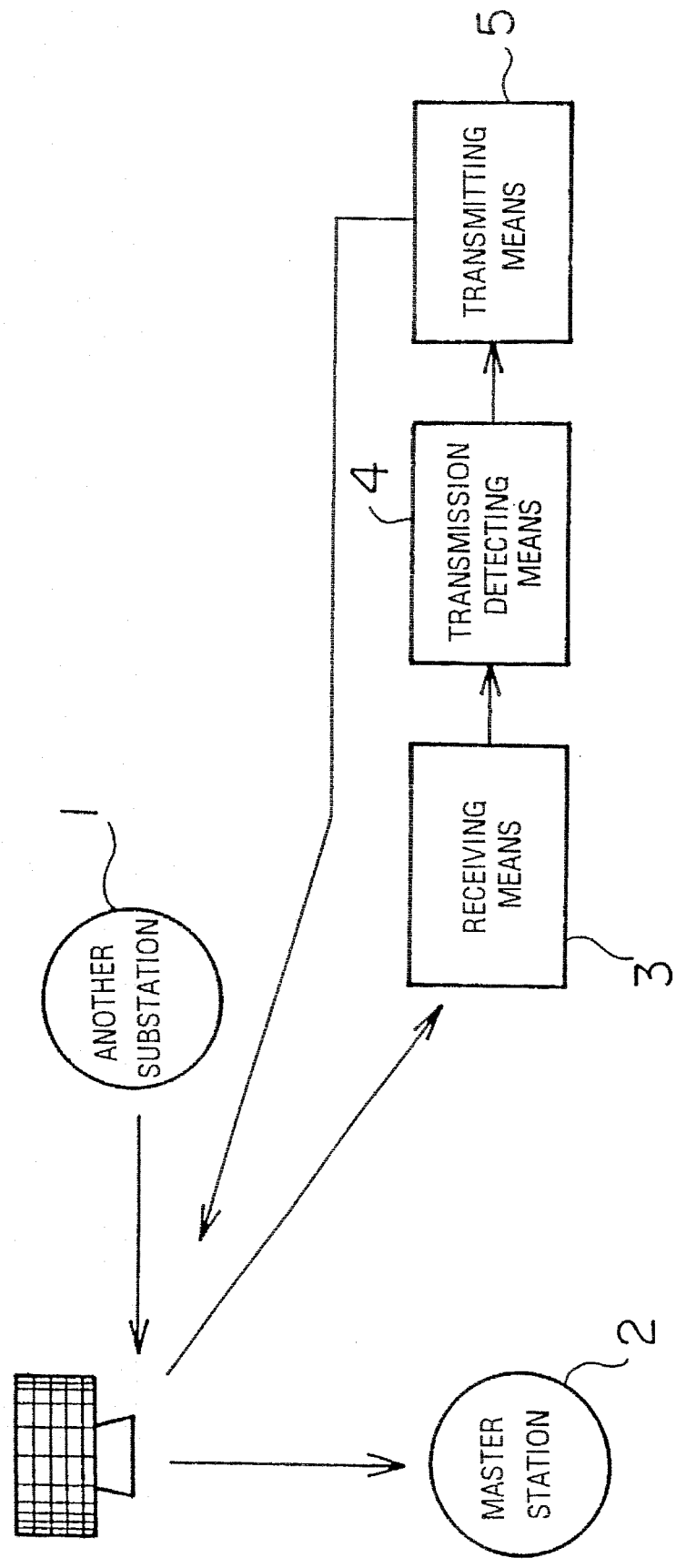
FIG. 1 is a diagram illustrating the principles of the present invention.

As shown in FIG. 1, a substation apparatus comprises receiving means 3 for receiving a radio wave transmitted from another substation 1 to a master station 2, transmission detecting means 4 for determining based on the output of the receiving means 3 whether the other substation 1 is transmitting data, and transmitting means 5 for controlling data transmission therefrom to the master station 2 in accordance with the output of the transmission detecting means 4.

In this arrangement, the receiving means 3 receives the radio wave transmitted from the other substation 1 to the master station 2, and based on the output of the receiving means 3, the transmission detecting means 4 determines whether the other substation 1 is transmitting data. When completion of data transmission from the other substation 1 is detected by the transmission detecting means 4, the transmitting means 5 transmits data to the master station 2. When it is judged by the transmission detecting means 4 that no data is being transmitted from the other substation 1, the transmitting data is immediately transmitted to the master station 2.

Thus, the substation immediately transmits a large amount of burst data if no delta is being transmitted from the other substations; if data is being transmitted from any of the other substations, the substation transmits a large amount of burst data immediately after the transmission is completed. Since no reservation is required for data transmission, a delay time associated with the reservation is zero.

The embodiments of the present invention will be now described in detail.

Figure 2:
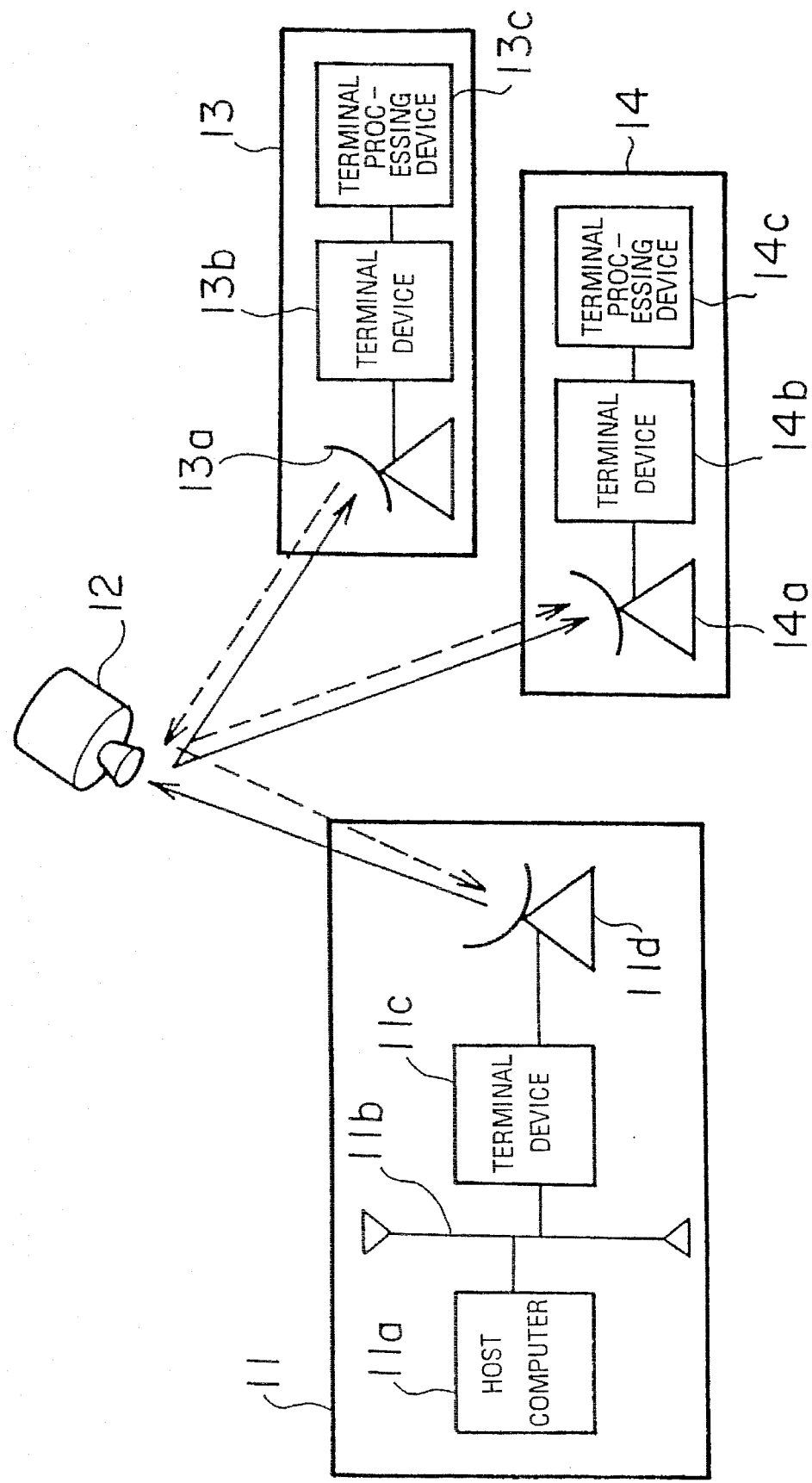
FIG. 2 is a diagram illustrating the entire configuration of a satellite communication system.

FIG. 2 illustrates the entire configuration of a satellite communication system including a VSAT station apparatus according to the present invention. A HUB station 11 comprises a host computer 11a, a LAN 11b, a terminal device 11c, and an antenna 11d. The terminal device 11c receives transmitting data from the host computer 11a via the LAN 11b, subjects the received data to digital modulation, and transmits the modulated data from the antenna 11d to a communication satellite 12 in the form of a radio wave of, e.g., 6 GHz. Also, the terminal device 11c receives a radio wave of, e.g., 4 GHz, from the communication satellite 12 via the antenna 11d, subjects the received radio wave to digital demodulation, and supplies the demodulated data to the host computer 11a via the LAN 11b.

In practice the communication system includes a number of VSAT stations (e.g., 150 stations), though the figure illustrates only two VSAT stations 13 and 14. The VSAT station 13 comprises an antenna 13a and terminal device 13b and terminal processing device 13c. The terminal device 13b is connected to the terminal processing device 13c (e.g., a personal computer) via an interface device such as an RS-232-C interface. The terminal device 13b has a transmitting-receiving function similar to that of the terminal device 11c in the HUB station 11. The internal arrangement of the terminal device 13b will be described in detail later with reference to FIGS. 3 and 5. The VSAT station 14 has an arrangement identical to that of the VSAT station 13. Signals transmitted from the VSAT stations 13 and 14 to the HUB station 11 via the communication satellite 12 are multiplexed according to TDMA technique.

The communication satellite 12 subjects a radio wave of, e.g., 6 GHz, received from the HUB station 11, to amplification and frequency conversion by means of a built-in transponder (satellite repeater), and transmits the frequency-converted 4-GHz wave to the VSAT stations 13 and 14. Also, the communication satellite 12 relays radio waves from the VSAT stations 13 and 14 to the HUB station 11. In the following, the transmission path from the HUB station 11 to the VSAT stations 13, 14 via the communication satellite 12 is called "out-route," and the transmission path from the VSAT stations 13, 14 to the HUB station 11 via the communication satellite 12 is called "in-route."

Figure 3:
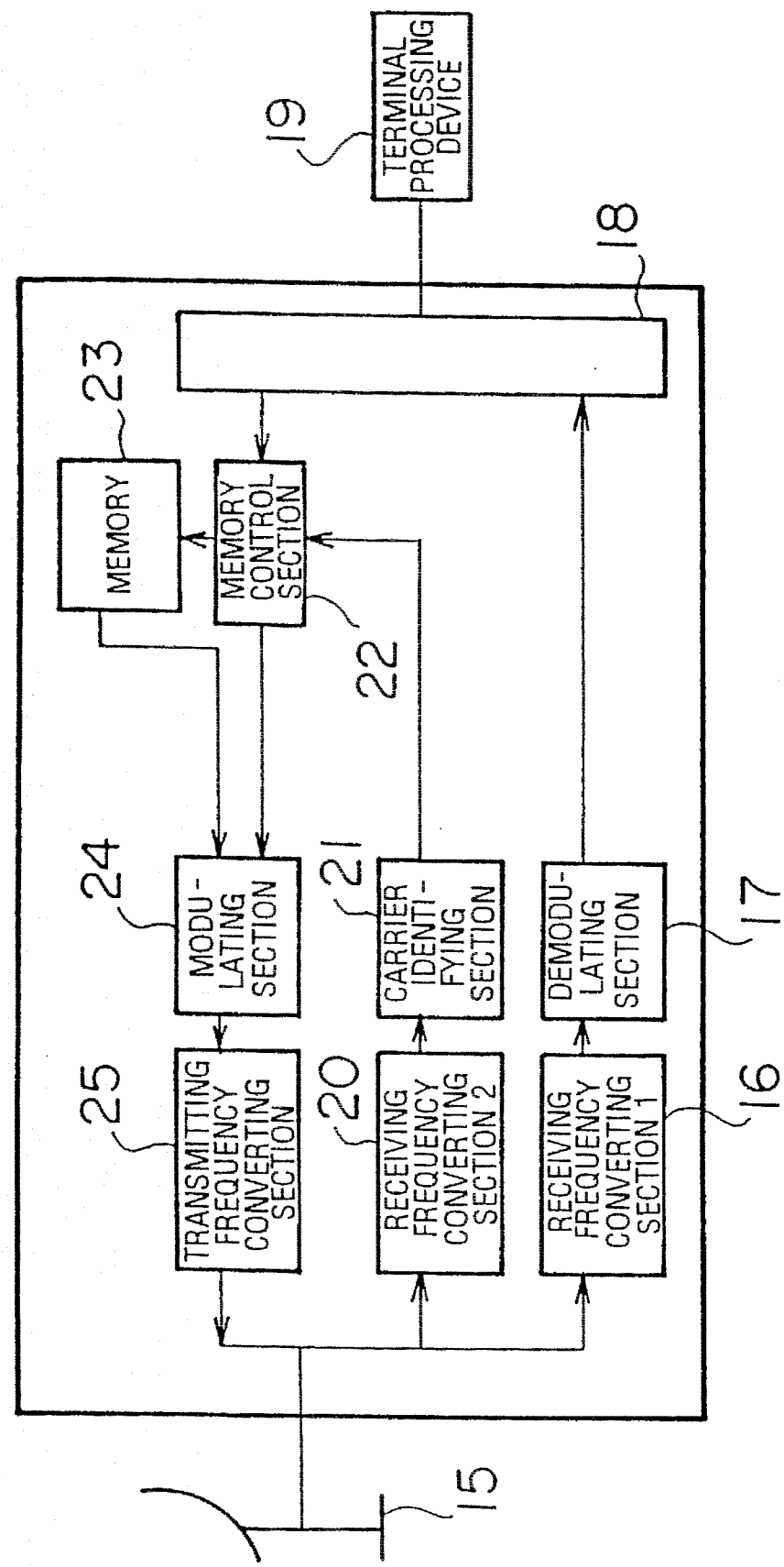
FIG. 3 is a block diagram showing the internal arrangement of a terminal device in a VSAT station according to a first embodiment.

FIG. 3 is a block diagram showing the internal arrangement of the terminal device in a VSAT station according to a first embodiment. An RF signal transmitted from the HUB station along the out-route and received by an antenna 15 is subjected to frequency conversion at a receiving frequency converting section 16 to obtain an IF signal, which is then subjected to digital demodulation at a demodulating section 17, and only the signal directed to this VSAT station is supplied to a terminal processing device 19 through a data interface 18. An RF signal transmitted from any other VSAT station along the in-route and received by the antenna 15 (this RF signal has a different frequency from the RF signal input to the receiving frequency converting section 16) is subjected to frequency conversion at a receiving frequency converting section 20 to obtain an IF signal, and a carrier identifying section 21 determiners whether this signal contains a carrier. Namely, if any of the other VSAT stations is transmitting data to the HUB station, then the carrier is detected by the carrier identifying section 21; in this case, a carrier detection signal is continuously supplied to a memory control section 22. On the other hand, if no one of the other VSAT stations is transmitting data to the HUB station, then no carrier detection signal is generated. When the carrier becomes undetected while the carrier detection signal is continuously output, that is, when the data transmission from any other VSAT station to the HUB station ends, the carrier identifying section 21 stops outputting the carrier detection signal.

The memory control section 22 is supplied with transmitting data in burst mode from the terminal processing device 19 via the data interface 18. If the carrier detection signal is being input to the memory control section 22 when the transmitting data is supplied thereto, the memory control section 22 outputs the transmitting data to a memory 23 to be stored therein, and when the input of the carrier detection signal stops thereafter, the memory control section 22 causes the memory 23 to output the transmitting data stored therein to a modulating section 24. If no carrier detection signal is being input to the memory control section 22 when the transmitting data is supplied thereto, the memory control section 22 outputs the transmitting data directly to the modulating section 24. The modulating section 24 subjects the transmitting data supplied thereto to digital modulation and supplies the modulated data to a transmitting frequency converting section 25. The transmitting frequency converting section 25 subjects the thus-modulated data to frequency conversion to obtain an RF signal, which is then transmitted from the antenna 15 to the HUB station along the in-route.

Figure 4:
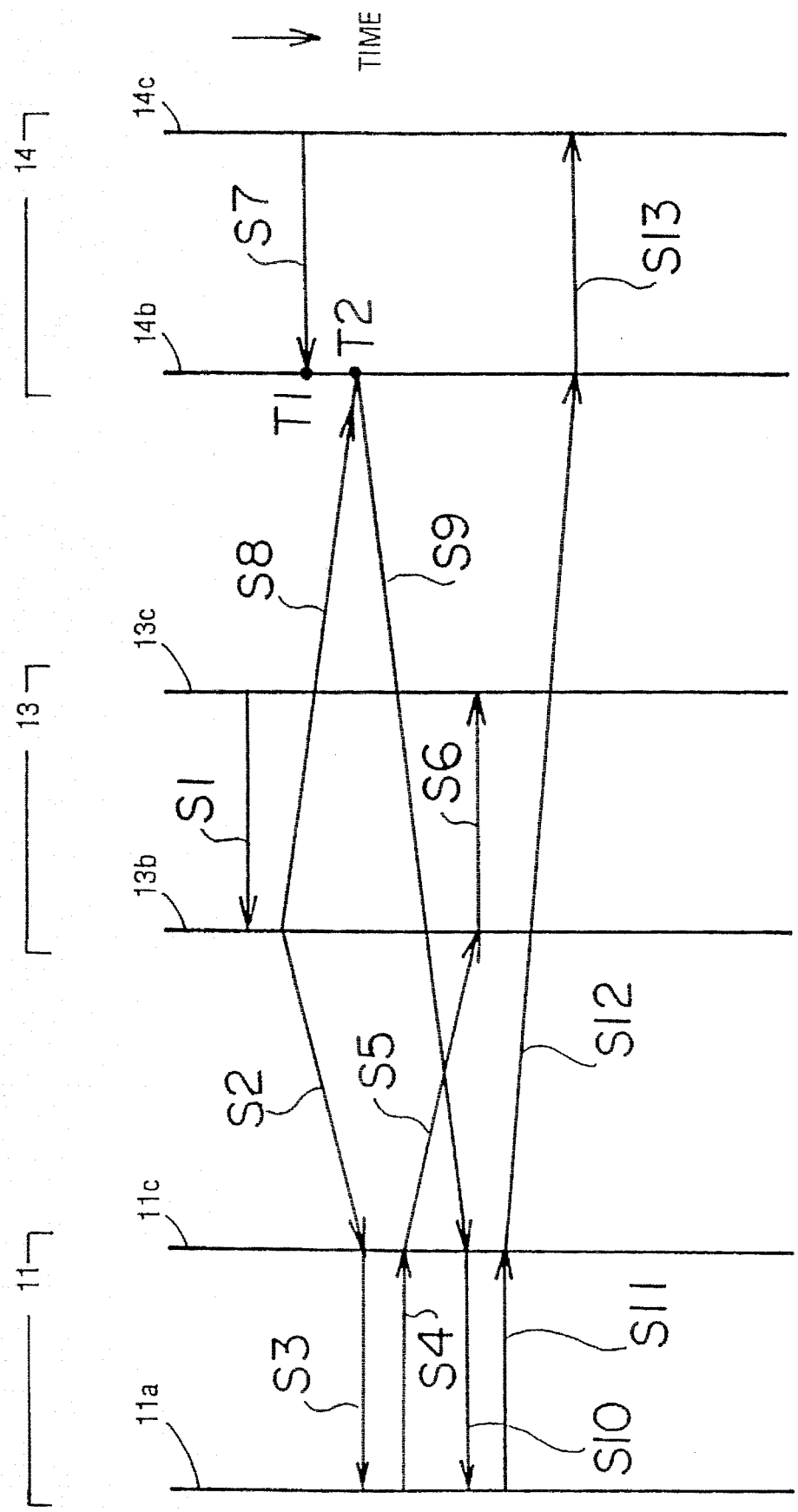
FIG. 4 is a chart showing a transmission sequence.

The operations of the VSAT stations each constructed as above and the HUB station will be explained with reference to FIG. 4 illustrating the transmission sequence. The explanation below is made in order of sequence number.

[S1] In the VSAT station 13, transmitting data D1 is transferred from the terminal processing device 13c to the terminal device 13b.

[S2] On confirming that no one of the other VSAT stations is transmitting data to the HUB station by detecting non-generation of the carrier detection signal, the terminal device 13b transmits the transmitting data. D1 to the HUB station via the in-route. The transmitted wave is received also by the other VSAT stations including the VSAT station 14, as mentioned later in Sequence S8.

[S3] In the HUB station 11, the terminal device 11c receives the transmitted data D1 and supplies the same to the host computer 11a.

[S4] In the HUB station 11, the host computer 11a supplies acknowledge data A1 to the terminal device 11c to inform the same that the transmitted data D1 has been received.

[S5] The terminal device 11c transmits the acknowledge data A1 to the terminal device 13b of the VSAT station 13 via the out-route.

[S6] The terminal device 13b supplies the acknowledge data A1 to the terminal processing device 13c.

[S7] In the VSAT station 14, transmitting data D2 is supplied from the terminal processing device 14c to the A5 terminal device 14b. T1 in the figure denotes the time at which the beginning of the transmitting data D2 reaches the terminal device 14b.

[S8] As mentioned above in Sequence S2, when the transmitting data D1 is transmittied from the terminal device 13b of the VSAT station 13 to the HUB station 11 via the in-route, the transmitted wave thereof is received also by the other VSAT stations including the VSAT station 14. T2 in the figure indicates the time at which all of the transmitting data D1 has reached the VSAT station 14.

[S9] Since at the time T1 the VSAT station 13 is transmitting data to the HUB station 11, the carrier detection signal is generated within the terminal device 14b of the VSAT station 14, and accordingly, the transmitting data D2 is stored in the memory. Generation of the carrier detection signal stops at the time T2; therefore, the transmitting data D2 stored in the memory is read out and transmitted from the VSAT station 14 to the HUB station 11 via the in-route.

[S10] In the HUB station 11, the terminal device 11c receives the transmitted data D2 and supplies the same to the host computer 11a.

[S11] In the HUB station 11, the host computer 11a supplies acknowledge data A2 to the terminal device 11c to inform the same that the transmitted data D2 has been received.

[S12] The terminal device 11c transmits the acknowledge data A2 to the terminal device 14b of the VSAT station 14 via the out-route.

[S13] The terminal device 14b supplies the acknowledge data A2 to the terminal proceesing device 14c.

As mentioned above, when the VSAT station 14 tries to transmit the transmitting data D2 (time T1) while another VSAT station 13 is transmitting data to the HUB station 11, the carrier is detected and thus the carrier detection signal is generated within the VSAT station 14. Accordingly, the VSAT station 14 temporarily stores the transmitting data D2 in response to the carrier detection signal. When the data transmission from the VSAT station 13 to the HUB station 11 is completed (time T2), the VSAT station 14 no longer detects the carrier and thus the carrier identifying section 21 therein stops outputting the carrier detection signal. Accordingly, the VSAT station 14 reads out the transmitting data D2 temporarily stored therein and transmits the same to the HUB station 11.

Thus, a vast amount of data can be transmitted in burst mode with good transmission efficiency and small delay, without broadening the occupied frequency band. Namely, in the apparatus of the first embodiment, since the VSAT stations are not previously assigned time slots for transmission via the in-route, situations can be avoided wherein useless time slots exist because even those VSAT stations having no transmitting data occupy their time slots, whereby high transmission efficiency is achieved. Further, since the embodiment does not use such measure as to set the transmissible amount of data to a value greater than the amount of actually transmitted data to prevent collision of transmitted data, it is not necessary to broaden the frequency band to be occupied. Furthermore, a delay time of about 0.5 second, which is required for making a reservation prior to transmission, does not exist.

A terminal device for a VSAT station according to a second embodiment will be now described. In the second embodiment, a flag contained in transmitted data is used to determine whether any other VSAT station is transmitting data, etc.

Figure 5:
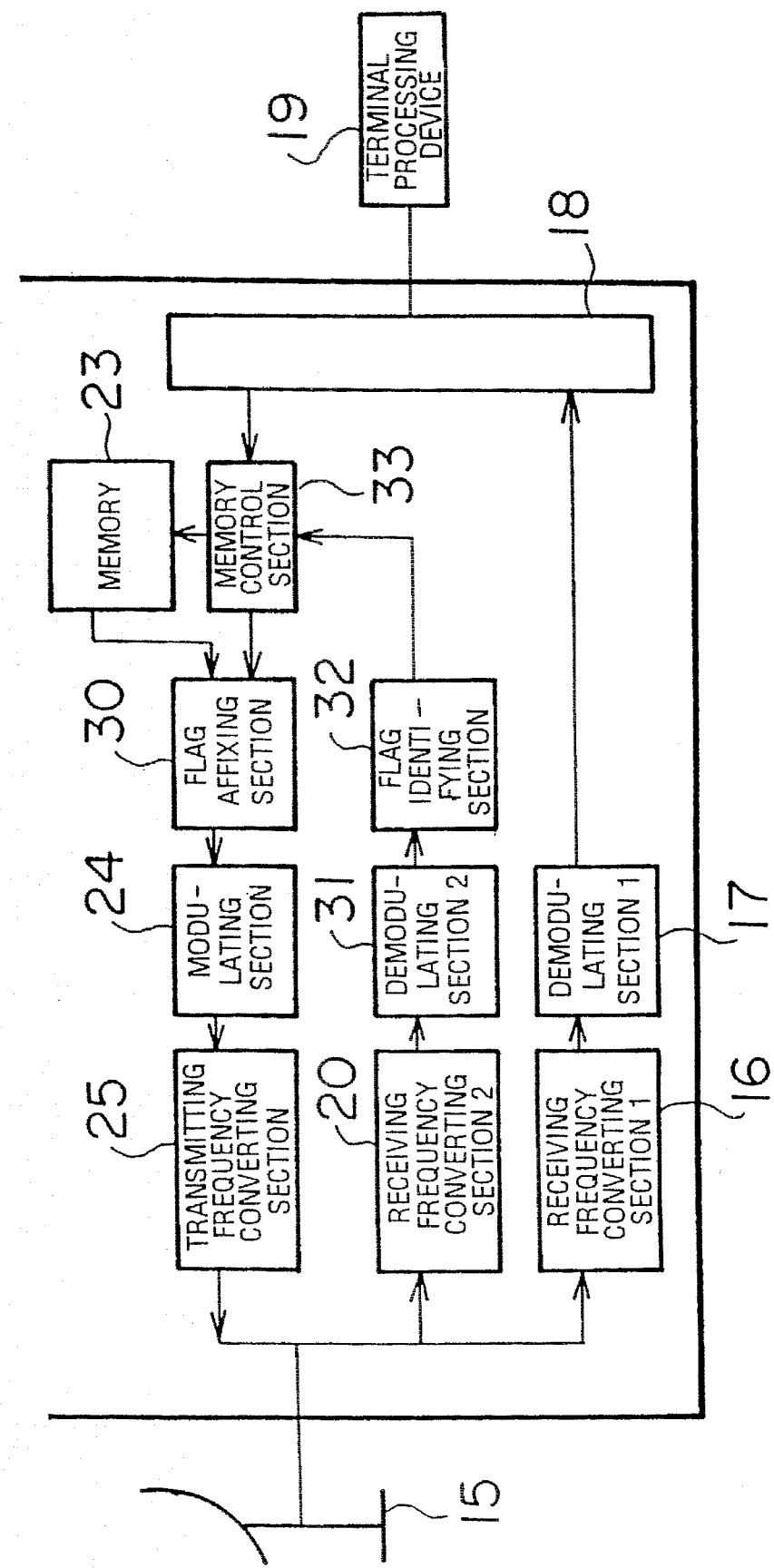
FIG. 5 is a block diagram showing the internal arrangement of a terminal device in a VSAT station according to a second embodiment.

FIG. 5 is a block diagram showing the internal arrangement of the terminal device in the VSAT station according to the second embodiment. In FIG. 5, like reference numerals are used to denote like component parts in the first embodiment, and description of such component parts is omitted.

In the second embodiment, a flag affixing section 30 affixes a flag to the transmitting data supplied thereto from the terminal processing device 19 via the data interface 18, memory 23 and memory control section 33, and then transmits the data. The method of affixing the flag will be explained with reference to FIG. 6.

Figure 6:
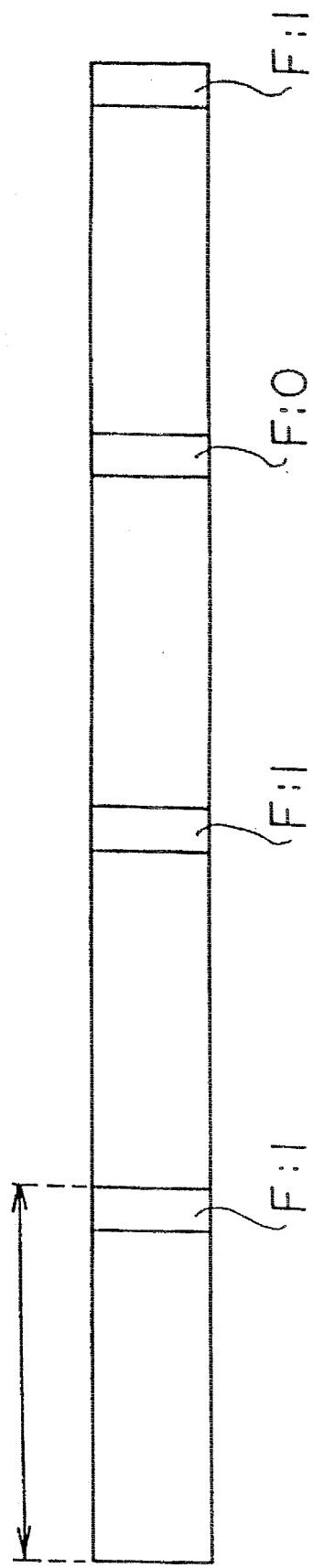
FIG. 6 is a diagram showing a transmitting frame format.

FIG. 6 illustrates the frame format of transmitting data. A large amount of burst data handled by this system can be advantageously dealt with by combining, for example, eight frames, into a superframe as a unit. To this end, a single block of transmitting data is divided into subdivided parts to be carried by a plurality of superframes. Further, a 1-bit flag area is affixed to the end of each superframe. When burst data is transmitted dividedly by a large number of superframes, the flag affixing section 30 sets the value "0" in the flag area of the superframe immediately preceding the last superframe. For all the other superframes, the flag affixing section 30 sets the value "1" in the flag areas.

Referring again to FIG. 5, a demodulating section 31 demodulates the IF signal, which has been transmitted from another VSAT s tation and subjected to frequency conversion at the receiving frequency converting section 20, and supplies the demodulated signal to a flag identifying section 32. The flag identifying section 32 monitors the flag area of each superframe in the demodulated signal, and upon detecting the value "1", continuously outputs a memory command signal to the memory control section 33. When the value "0" is detected thereafter, the flag identifying section 32 outputs a memory readout command signal to the memory control section 33 upon lapse of a required time period after the instant of detection of the value "0". The required time period corresponds to the length (duration) of the superframe.

If no signal is input from the flag identifying section 32 when transmitting data is supplied from the terminal processing device 19 via the data interface 18, the memory control section 33 judges that no one of the other VSAT stations is transmitting data to the HUB station, and accordingly, outputs the transmitting data directly to the flag affixing section 30.

On the other hand, if the memory command signal is being input when the transmitting data is supplied from the terminal processing device 19, the memory control section 33 judges that another VSAT station is transmitting data to the HUB station, and thus outputs the transmitting data to the memory 23 to be stored therein. When supplied with the memory readout command signal thereafter, the memory control section 33 causes the memory 23 to output the transmitting data stored therein to the flag affixing section 30.

As mentioned above, since in the second embodiment, the flag area is provided, whether or not another VSAT station is transmitting data can be determined based on the value set in the flag area, and the time of completion of such data transmission can be easily predicted, thus permitting a waiting station to immediately start transmitting data therefrom as soon as the preceding transmission is completed.

In the second embodiment, the value "0" is set in the flag area of the superframe immediately preceding the last superframe. Alternatively, the value "1" may be set in the flag areas of all superframes and the flag identifying section 32 generates only the memory command signal, and not the memory readout command signal, such that when the memory command signal becomes undetected, the memory control section 33 causes the memory 23 to output the transmitting data stored therein to the flag affixing section 30. In this arrangement, however, the timing for the initiation of data transmission from each VSAT station slightly delays.

As described above, according to the present invention, each substation detects a wave transmitted from another substation to the master station to determine whether another substation is transmitting data, and immediately starts transmitting data therefrom upon completion of the ongoing transmission. Accordingly, a large amount of burst data can be transmitted with good transmission efficiency and small delay, without broadening the occupied frequency bandwidth.

Consequently, the idle time of the transponder in the communication satellite can also be shortened.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A substation apparatus for satellite communication in which communication between a master station and a plurality of substations is achieved via a communication satellite, comprising:

receiving means for receiving a radio wave transmitted from another substation to the master station;

transmission detecting means for determining based on an output of said receiving means whether another substation is transmitting data; and transmitting means for controlling data transmission therefrom to the master station in accordance with an output of said transmission detecting means, wherein said transmission detecting means includes identification signal detecting means for detecting an identification signal from the output of said receiving means, and determining means for determining whether or not another substation is transmitting data to the master station, based on the identification signal detected by said identification signal detecting means.

2. A substation apparatus for satellite communication in which communication between a master station and a plurality of substations is achieved via a communication satellite, comprising:

receiving means for receiving a radio wave transmitted from another substation to the master station;

identification signal detecting means for detecting an identification signal from an output of said receiving means;

end timing detecting means for detecting timing at which data transmission from said another substation to the master station ends, based on the identification signal detected by said identification signal detecting means; and transmitting means for controlling data transmission therefrom to the master station in accordance with outputs of said end timing detecting means and said identification signal detecting means.

3. The substation apparatus according to claim 2, wherein data transmitted from each substation to the master station is carried dividedly by a plurality of frames each including a flag area, and said identification signal is carried by the flag area of a frame which precedes a last one of a plurality of frames constituting a single block of transmitting data by a predetermined number of frames.

* * * * *